United States Patent [19]

Dalton

[11] Patent Number: 5,405,256
[45] Date of Patent: Apr. 11, 1995

[54] APPARATUS FOR FOLDING A DOUGH LEAF ABOUT A FILLING

[75] Inventor: Michael V. Dalton, Cape Town, South Africa

[73] Assignee: The Cape Investment Syndicate (Proprietary) Limited, Cape Town, South Africa

[21] Appl. No.: 91,306

[22] Filed: Jul. 13, 1993

[30] Foreign Application Priority Data

Jul. 13, 1992 [ZA] South Africa .............. 92/5220

[51] Int. Cl.$^6$ ............................................. A21C 11/00
[52] U.S. Cl. ................................ 425/343; 99/450.6; 425/112; 425/394; 425/395; 425/409; 425/436 R; 425/444; 426/94; 426/297
[58] Field of Search ............... 425/110, 112, 340, 343, 425/394, 395, 406, 409, 436 R, 436 RM, 444; 99/450.6; 426/502, 94, 283, 297

[56] References Cited

U.S. PATENT DOCUMENTS

| 2,055,726 | 9/1936 | Moss | 99/450.6 |
| 3,690,248 | 9/1972 | Schafer | 99/450.6 |
| 3,912,433 | 10/1975 | Ma | 425/126 R |
| 4,651,635 | 3/1987 | Ally | 425/340 |
| 5,263,407 | 11/1993 | Pomara, Jr. | 99/450.6 |
| 5,268,188 | 12/1993 | Diem et al. | 426/502 |
| 5,281,427 | 1/1994 | Rahim | 425/406 |

FOREIGN PATENT DOCUMENTS

84/6870  9/1984  South Africa .

Primary Examiner—James P. Mackey
Attorney, Agent, or Firm—Ladas & Parry

[57] ABSTRACT

Apparatus for folding a dough leaf 30 about a filling 32 comprises a series of folding pans 26.1 to 26.6. Each folding pan is foldable with respect to the next pan in the series about a folding axis 28.1 to 28.5, and is provided with a weighted plunger 34 which is connected to the folding pan by a lost motion connection. The weighted plunger serves to hold the dough leaf down while the pan is displaced from the folded position back towards the unfolded position, to prevent the dough from sticking to the pan.

2 Claims, 2 Drawing Sheets

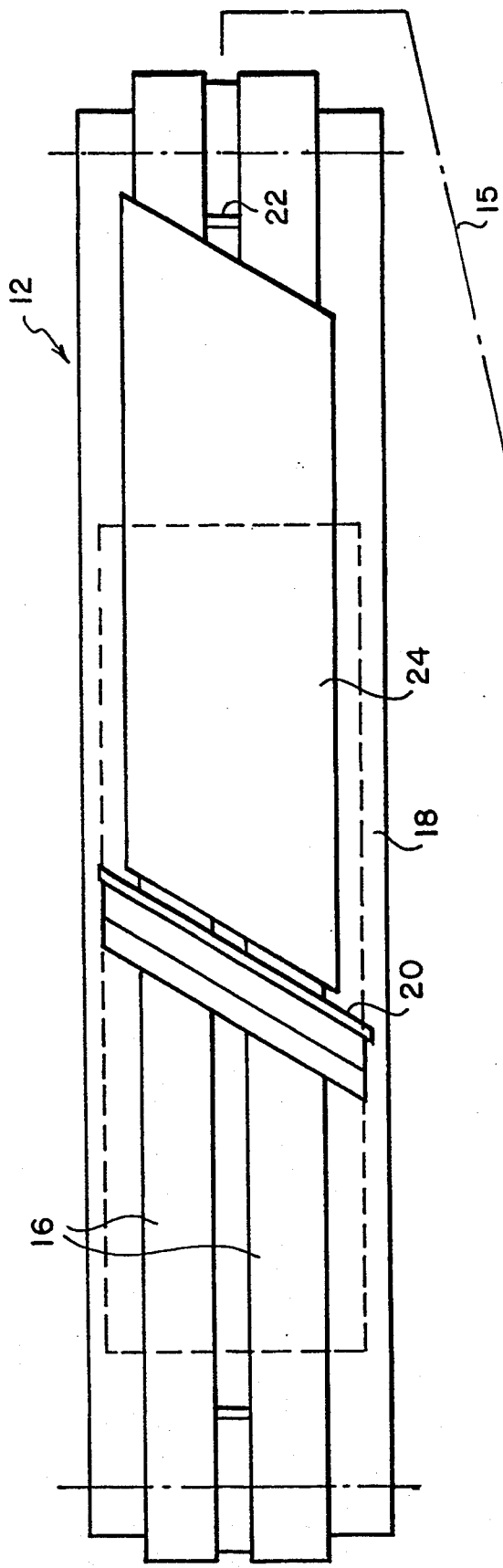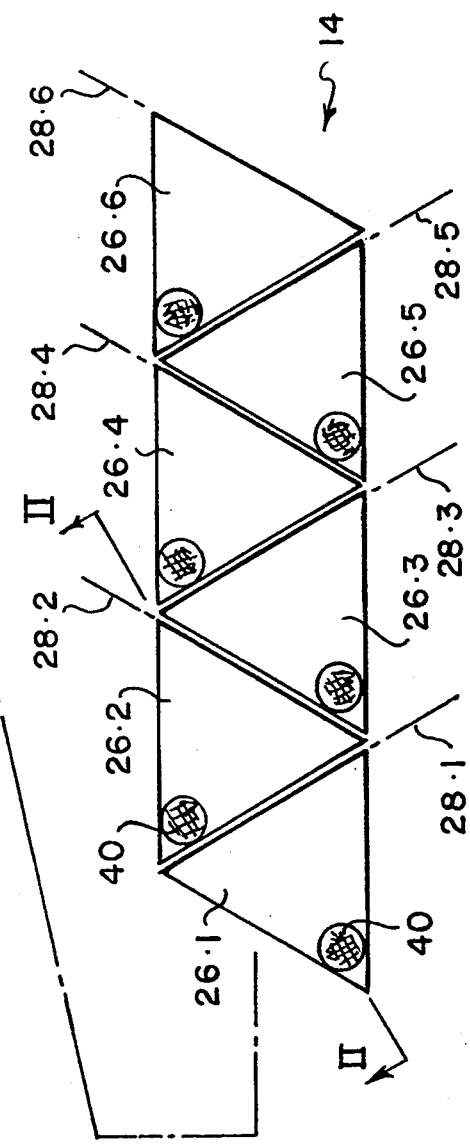
FIG. I

APPARATUS FOR FOLDING A DOUGH LEAF ABOUT A FILLING

FIELD OF THE INVENTION

This invention relates to apparatus for folding a dough leaf about a filling.

BACKGROUND TO THE INVENTION

Apparatus of this kind generally includes a folding pan arrangement which comprises a series of two or more folding pans each of which is pivotally displaceable about a folding axis, from an unfolded position in which it is adjacent to and generally at the same level as the next folding pan in the series, and a folded position in which it overlies said next folding pan. In use, a dough leaf is placed on the folding pan arrangement and the folding pans are then, one after the other, displaced from the unfolded position to the folded position and then back again to the unfolded position. This results in the dough leaf being folded about the filling.

When a folding pan moves back to the unfolded position, it is essential that the dough leaf releases properly from the pan, otherwise the operation has to be interrupted.

Preparation of the dough leaf generally takes place under relatively hot conditions, whereas folding takes place under relatively cold conditions. In existing apparatus of the kind in question, this gives rise to condensation of moisture on the folding pans, particularly when the weather is cold and humid. When the moisture comes into contact with the dough it makes the dough tacky and increases the tendency for the dough to adhere to the folding pans.

It is an object of the present invention to overcome or at least mitigate the above problem.

SUMMARY OF THE INVENTION

According to the invention there is provided apparatus for folding a dough leaf about a filling, the apparatus comprising a series of folding pans, each pan being pivotally displaceable about a folding axis from an unfolded position in which it is adjacent to and extends away from the next folding pan in the series, to a folded position in which it overlies said next folding pan, and each folding pan being provided with means for separating the folded part of the dough leaf from the pan while the pan is initially displaced from the folded position back towards the unfolded position.

Said means may include a contact element on the inside of, and displaceable relative to, the respective pan, the contact element being arranged to make contact with and hold the dough leaf down while the pan is initially displaced from the folded position back to the unfolded position.

The contact element may form part of a slidable plunger which is connected to the respective folding pan by a lost motion connection.

The plunger may be a weighted plunger whose arrangement is such that it holds the contact element down gravitationally on the dough leaf while the pan is initially displaced from the folded position back to the unfolded position.

BRIEF DESCRIPTION OF THE DRAWINGS

The invention will now be described in more detail, by way of example, with reference to the accompanying drawings.

In the drawings:

FIG. 1 is a plan view of apparatus in accordance with the invention, showing all the folding pans thereof in their unfolded positions;

DETAILED DESCRIPTION OF PREFERRED EMBODIMENT

Figure 2:
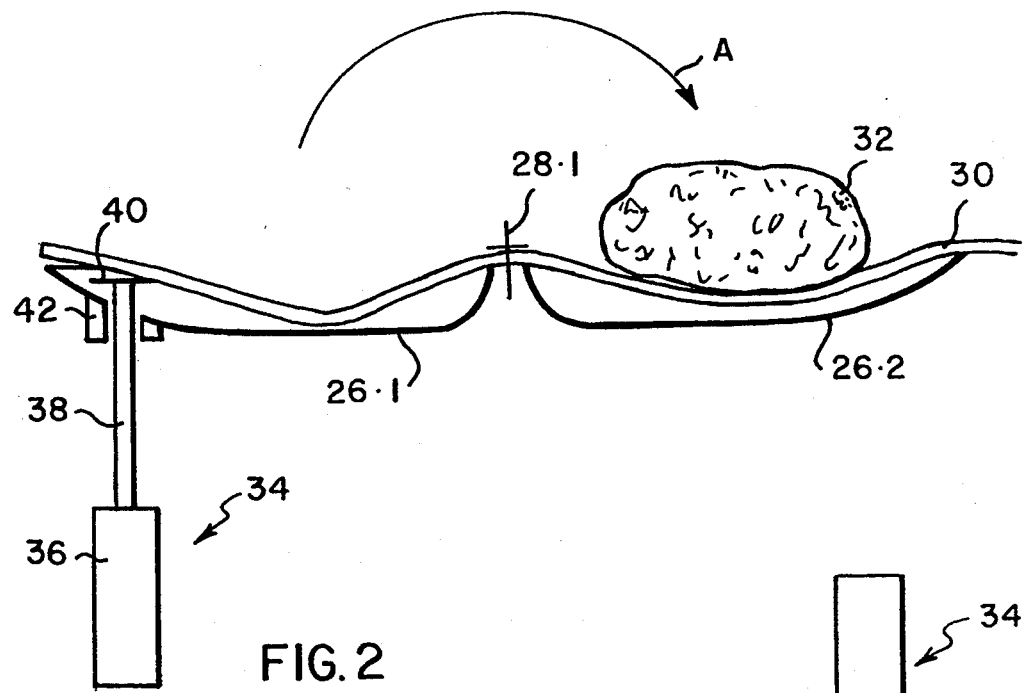
FIG. 2 is a section on II—II in FIG. 1.

Referring now to the drawings in more detail, Reference numeral 10 generally indicates apparatus for folding a dough leaf onto a filling, the apparatus being designed particularly for the production of samoosas which are triangular pastries comprising a dough leaf folded about a savory filling. The apparatus comprises a transport and cutting mechanism 12, and a folding pan assembly 14. The chain-dotted line 15 indicates that the sections 12 and 14 are in line with one another.

The transport and cutting mechanism 12 comprises a pair of endless belts 16, the upper runs of which are visible in the drawing and are supported slidably on a heated base plate 18. Above the belts 16 there is a cutting blade 20 which is set at an angle of 60° to the direction of travel of the belts. Towards the head end of the belts there is a sensor 22 which is able to detect the leading end of a dough leaf strip. Between the cutting blade 20 and the sensor 22 there is a transfer plate 24 whose ends are at an angle corresponding to the angle of the cutting blade 20. The transfer plate 24 comprises a suction chamber which has a perforated plate (not shown) at the bottom. There is also a suction device (not shown) whereby suction can be applied to the suction chamber.

The folding pan assembly 14 comprises a series of dished triangular folding pans 26.1 to 26.6. The first folding pan 26.1 is pivotally displaceable about a first pivot axis 28.1, the second folding pan 26.2 about a second pivot axis 28.2, and so on.

In use, a dough leaf strip (which is indicated by reference numeral 30 in FIGS. 2 to 4) is fed onto the belts 16, at the tail end thereof. The belts carry the dough leaf to the head end of the belts. As soon as the sensor 22 detects the leading end of the dough leaf, the cutting blade 20 operates in response thereto, to cut the dough leaf. Following this, suction is applied to the suction chamber of the transfer plate 24, which causes the transfer plate to lift the piece of dough leaf from the belts 16. The transfer plate 24 is then displaced to a position in which the piece of dough leaf it carries is above the folding pan as-assembly 14, whereupon the suction is removed, thus releasing the dough leaf and allowing it to drop onto the folding pan assembly. The dough leaf will now be in the position illustrated in FIG. 2.

A predetermined quantity of filling 32 will now be deposited on that part of the dough leaf 30 which is supported by the second folding pan 26.2.

Thereafter, by means of a pneumatic actuator, the first folding pan 26.1 is folded about the pivot axis 28.1, to move it from the unfolded position illustrated in FIG.

Figure 3:
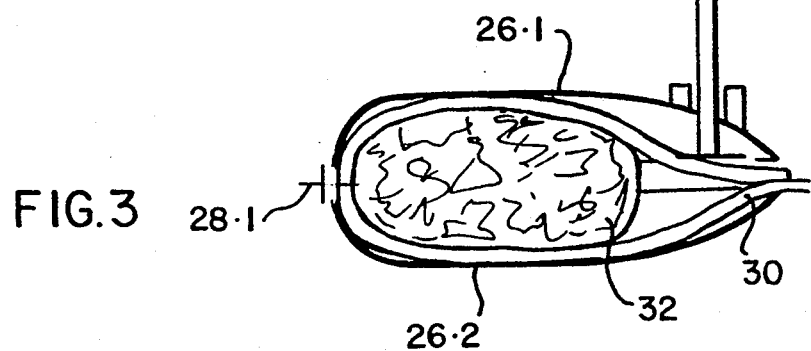
FIG. 3 is a section similar to that shown in FIG. 2, but with one of the folding pans in its folded position.

2, in the direction of arrow A, to the folded position illustrated in FIG. 3. This has the effect of folding that part of the dough leaf which was supported by the folded pan 26.1 onto the filling 32. Thereafter, the pneumatic actuator moves the first folding pan 26.1 back to the unfolded position, and as indicated by arrow B in FIG. 4.

Thereafter, the second folding pan 26.2 is pivoted about the second pivot axis 28.2, thereafter the third folding pan 26.3 about the third pivot axis 28,3, and so on, until the entire dough leaf strip has been folded about the filling 32.

While all of this is taking place, dough leaf is continuously fed onto the belts 16, the mechanism 12 being operative to cut the strip in predetermined lengths and to transfer these lengths one after the other onto the folding pan assembly 14.

In accordance with the invention, each of the folding pans 26.1 to 26.6 is provided with a weighted plunger 34, the plunger being arranged in that corner of the folding pan which is remote from the pivot axis of that folding pan. The weighted plunger has a body 36 on the outside of the pan, a shaft 38, and a head 40 at the end of the shaft and inside the pan. The shaft is slidably displaceable in a bush 42 which is fixed to the folding pan. When the folding pan 26.1 is in the position illustrated in FIG. 2, the plunger 34 will be in a retracted position. When, however, the folding pan 26.1 is in the folded position illustrated in FIG. 3, the plunger will, via the head 40 thereof, bear down on the superimposed parts of the dough leaf and has the effect of at least partly releasing the dough leaf from the folding pan 26.1.

Figure 4:
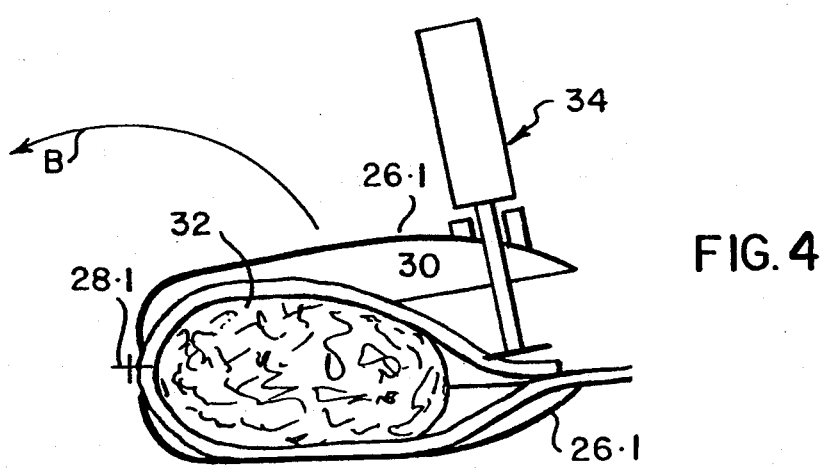
FIG. 4 is a section similar to that shown in FIG. 3, but showing the folded pan shortly after it has started to move back to its unfolded position.

As can best be seen in FIGS. 3 and 4, there is a certain degree of lost motion between the weighted plunger 34 and the folding pan 26.1 so that, during the initial part of the movement of the folding pan 26.1 back to its unfolded position, the plunger keeps pressing down on the superimposed parts of the dough leaf. This ensures that the dough leaf properly separates from the folding pan, even in the presence of moisture on the pan.

I claim:

1. Apparatus for folding dough leaf about a filling, the apparatus comprising a series of folding pans for folding a dough leaf supported on the pans, each pan being pivotally displaceable about a folding axis from an unfolded position in which it is adjacent to and extends away from the next folding pan in the series, to a folded position in which it overlies said next folding pan, thereby to fold part of the dough leaf to form a folded part which overlies the remainder of the dough leaf and each folding pan being provided with means for separating the folded part of the dough leaf from the pan while the pan is initially displaced from the folded position back towards the unfolded position, said means including a contact element on the inside of, and displaceable relative to, the respective pan, the contact element being arranged to make contact with and hold the dough leaf down while the pan is initially displaced from the folded position back to the unfolded position, and the contact element forming part of a slidable plunger which is connected to the respective folding pan by a lost motion connection.

2. Apparatus according to claim 1, wherein the plunger is a weighted plunger whose arrangement is such that it holds the contact element down gravitationally on the dough leaf while the pan is initially displaced from the folded position back to the unfolded position.

* * * * *